(12) United States Patent
Schroedle et al.

(10) Patent No.: US 9,321,656 B2
(45) Date of Patent: Apr. 26, 2016

(54) PROCESS FOR PREPARING AQUEOUS SOLUTIONS OF COBALT SULFATE

(71) Applicant: BASF SE, Ludwigshafen (DE)

(72) Inventors: Simon Schroedle, Donauwoerth (DE); Peter Dransfeld, Albisheim (DE); Gabriele Iffland, Heidelberg (DE); Ralf Boehling, Lorsch (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/405,025

(22) PCT Filed: Jul. 2, 2013

(86) PCT No.: PCT/EP2013/063953
§ 371 (c)(1),
(2) Date: Dec. 2, 2014

(87) PCT Pub. No.: WO2014/009208
PCT Pub. Date: Jan. 16, 2014

(65) Prior Publication Data
US 2015/0151981 A1    Jun. 4, 2015

(30) Foreign Application Priority Data
Jul. 10, 2012 (EP) .................................. 12175702

(51) Int. Cl.
*C01G 51/10*    (2006.01)

(52) U.S. Cl.
CPC ............ *C01G 51/10* (2013.01); *C01P 2006/80* (2013.01)

(58) Field of Classification Search
CPC ........................................................ C01G 51/10
USPC ........................................................ 423/146
See application file for complete search history.

(56) References Cited

FOREIGN PATENT DOCUMENTS

| EP | 0 047 076 A1 | 3/1982 | |
|----|---|---|---|
| JP | 63 045131 A  * | 2/1988 | ............. C01G 51/10 |
| JP | 1-301526 | 12/1989 | |
| RU | 385 927 A1 | 6/1973 | |
| WO | WO 2014/009173 A1 | 1/2014 | |

OTHER PUBLICATIONS

U.S. Appl. No. 14/412,231, filed Dec. 31, 2014, Schroedle, et al.
International Search Report issued Sep. 23, 2013 in PCT/EP2013/063953.
International Preliminary Report on Patentability issued Mar. 21, 2014 in PCT/EP2013/063953 filed on Jul. 2, 2013.

* cited by examiner

*Primary Examiner* — Timothy Vanoy
(74) *Attorney, Agent, or Firm* — Oblon, McClelland, Maier & Neustadt, L.L.P.

(57) ABSTRACT

Process for preparing an aqueous cobalt sulfate solution having a pH in the range from 5 to 8, wherein
(a) metallic cobalt is dissolved in aqueous sulfuric acid in an atmosphere of low-oxygen air, of hydrogen or of inert gas and
(b) the resulting acidic cobalt sulfate solution is purified in an ion exchanger.

11 Claims, No Drawings

PROCESS FOR PREPARING AQUEOUS SOLUTIONS OF COBALT SULFATE

The present invention relates to a process for preparing an aqueous cobalt sulfate solution having a pH in the range from 5 to 8, wherein
(a) metallic cobalt is dissolved in aqueous sulfuric acid in an atmosphere of hydrogen or of inert gas or of nitrogen/oxygen mixtures comprising nitrogen and oxygen in a volume ratio in the range from 6:1 to 100:1, and
(b) the resulting acidic cobalt sulfate solution is purified in an ion exchanger.

Cobalt sulfate can be used as starting material for numerous applications, for example for pigments or for producing glazes for clay. Cobalt sulfate has attained particular importance recently as cobalt source for electrode materials of lithium ion batteries. Mixed hydroxides or carbonates of appropriate transition metals are precipitated from aqueous solutions of transition metal sulfates, for example from mixed nickel-cobalt-manganese sulfate solutions and these are then processed thermally together with a lithium compound, for example lithium hydroxide or lithium carbonate, to give an electrode material.

A key compound for cobalt here is cobalt sulfate, either in solid form or in aqueous solution. Cobalt sulfate is in many cases prepared by dissolution of metallic cobalt in sulfuric acid.

For the further processing, it is of great importance to obtain solutions of cobalt sulfate which ideally have a comparatively high pH, for example at least 5. It is desirable to obtain solutions of cobalt sulfate which comprise elements which interfere in lithium ion batteries and are therefore undesirable only in an extremely small amount. Depending on the use and structure of the lithium ion battery, copper, aluminum, chromium, iron or calcium, for example, can be considered to interfere. Chromium, copper and iron can be purified only with extreme difficulty at a pH of 2 or less.

Thus, SU 385927 discloses a process in which metallic cobalt is firstly treated simultaneously with 40% sulfuric acid and 30% aqueous $H_2O_2$ at from 80 to 90° C. in an enameled apparatus. A hydrogen/oxygen mixture can be formed in the apparatus as a result of such a procedure, which is disadvantageous for safety reasons. The cobalt sulfate solution which can be obtained in this way has a residual sulfuric acid content of from 0.2 to 0.4%, corresponding to a pH in the range from 1.5 to 1.8. Such solutions are difficult to purify.

It is therefore an object of the invention to provide a process by means of which it is possible to prepare cobalt sulfate solutions which have a pH of at least 4 and which can readily be carried out industrially. In particular, it is an object to provide a process by means of which it is possible to prepare cobalt sulfate solutions which have only extremely small proportions of ions which interfere in lithium ion batteries.

We have accordingly found the process defined at the outset, also referred to as process of the invention for short.

Carrying out the process of the invention gives aqueous cobalt sulfate solutions having a pH from 5 to 8, particularly preferably from 5.5 to 7. The pH is in each case determined at 23° C., preferably by means of a glass electrode, particularly preferably by means of a combination electrode.

The process of the invention has at least two process steps (a) and (b), also referred to as step (a) and step (b) for short.

In step (a) of the process of the invention, metallic cobalt is dissolved in aqueous sulfuric acid in an atmosphere of hydrogen or of inert gas or of those nitrogen/oxygen mixtures which comprise nitrogen and oxygen in a volume ratio in the range from 6:1 to 100:1.

Metallic cobalt is used as starting material for carrying out the process of the invention. Metallic cobalt can be used, for example, in the form of powder, sheets, plates, lumps, turnings, electrode fragments, optionally cut, in the form of briquettes, with preference being given to lumps, briquettes and electrode fragments, which may be cut. Powders can, for example, have an average particle diameter in the range from 0.1 to 1 mm. Sheets can, for example, have a thickness in the range from 0.1 mm to 5 mm and a length and width which are identical or different and are each in the range from 2 cm to 10 meters, in particular in the range from 2 to 10 cm. Plates can, for example, have a thickness in the range from 5.5 mm to 2 cm and a length and width which are identical or different and are each in the range from 10 cm to 1 m. Lumps for the purposes of the present invention can, for example, have a length, width and height in the range from 5 mm to 10 cm, with the smallest dimension and the largest dimension differing by a factor of not more than three. Turnings, can, for example, have a thickness in the range from 0.1 to 1 mm, a width in the range from 1 mm to 5 mm and a length in the range from 1 cm to 20 cm. Briquettes can have a length in the range from 2 to 3 cm and a diameter in the range from 12 to 14 mm. Electrode fragments can, for example, have a thickness in the range from 0.5 to 7 mm. In many cases, uncut electrode fragments have a thickness in the range from 1 to 3 mm and irregular cross sections, with the diameter at the broadest place not exceeding 40 mm and the average diameter being in the range from 10 to 30 mm. Cut electrodes can have a thickness in the range from 0.5 to 7 mm. For example, it is possible to obtain cut electrode fragments having a thickness of 1 mm and a cross section of 10·10 cm or a thickness in the range from 5 to 7 mm and a cross section of 55·55 mm.

In an embodiment of the present invention, metallic cobalt having a high purity, for example less than a total of 100 ppm of foreign metals, is used as starting material. As foreign metals, mention may be made of, for example, Ca, Al, Fe, Cu, Cr and Mg. In another embodiment of the present invention, cobalt which is contaminated with one or more of the above-mentioned foreign metals, for example with from 100 ppm up to a total of 1% by weight of Ca, Al, Fe, Cu, Cr and/or Mg, in each case based on cobalt, is used as starting material.

For example, metallic cobalt can comprise from 10 to 200 ppm of Ca, based on cobalt.

For example, metallic cobalt can comprise from 10 to 500 ppm of Fe, based on cobalt.

For example, metallic cobalt can comprise from 2 to 500 ppm of Cu, based on cobalt.

For example, metallic cobalt can comprise from 2 to 500 ppm of Cr, based on cobalt.

For example, metallic cobalt can comprise from 10 to 1000 ppm of Mg, based on cobalt.

For example, metallic cobalt can comprise from 1 to 100 ppm of Al, based on cobalt.

For the purposes of the present invention, ppm are always ppm by weight unless expressly indicated otherwise.

In one variant, metallic cobalt comprises from 10 to 200 ppm of Ca, from 10 to 500 ppm of Fe, from 2 to 500 ppm of Cr, from 10 to 1000 ppm of Mg, from 1 to 100 ppm of Al and from 2 to 500 ppm of Cu, in each case based on cobalt.

In an embodiment of the present invention, metallic cobalt can comprise nickel and/or manganese, for example in each case up to 5% by weight. Metallic cobalt preferably comprises no measurable proportions of manganese and up to 1% by weight of nickel. Such proportions of manganese and/or nickel do not interfere particularly when cobalt sulfate is to be used for applications in lithium ion batteries.

In an embodiment of the present invention, cobalt obtained from electrode scrap is used as starting material, or the electrode scrap concerned is comminuted.

In the context of step (a), "dissolve" refers to a chemical reaction in which metallic cobalt which is not soluble in an aqueous medium is converted into water-soluble cobalt sulfate.

In addition, aqueous sulfuric acid is used for carrying out step (a).

For the purposes of the present invention, aqueous sulfuric acid is a sulfuric acid which comprises water which can be unprotonated or protonated. For example, the water content of aqueous sulfuric acid can be in the range from 5 to 95% by weight, based on $H_2SO_4$, preferably from 15 to 30% by weight, in each case at the beginning of step (a).

In an embodiment of the present invention, metallic cobalt and aqueous sulfuric acid are brought into contact with one another. For example, a reaction vessel can firstly be charged with cobalt and sulfuric acid can then be added. In another variant, aqueous sulfuric acid can firstly be placed in a reaction vessel and metallic cobalt can then be added.

In a specific variant, metallic cobalt is placed in a reaction vessel and aqueous sulfuric acid is then added. The acidic cobalt sulfate solution formed is removed continuously and a fresh aqueous sulfuric acid is added, for example by means of a pump, or acidic cobalt sulfate solution is circulated. This procedure makes particularly simple removal of heat possible.

In an embodiment of the present invention, step (a) of the process of the invention is carried out at a temperature in the range from 80 to 110° C., preferably from 95 to 99° C. It is possible here to work under superatmospheric pressure, for example from 1.1 bar to 5 bar, when step (a) is to be carried out at temperatures of 100° or more. Step (a) is preferably carried out with evaporative cooling and pressure and temperature are set automatically as a result.

In an embodiment of the present invention, step (a) of the process of the invention is carried out at atmospheric pressure. In another embodiment of the process of the invention, step (a) is carried out at the pressure which is automatically established with evaporative cooling, for example from 1 bar to 5 bar.

Step (a) is carried out in an atmosphere of hydrogen or of inert gas or of nitrogen/oxygen mixtures comprising nitrogen and oxygen in a volume ratio in the range from 6:1 to 100:1, i.e. metallic cobalt is dissolved under an atmosphere of hydrogen or of inert gas or of nitrogen/oxygen mixtures comprising nitrogen and oxygen in a volume ratio in the range from 6:1 to 100:1. Noble gases, for example argon, and in particular nitrogen are suitable as inert gases. As nitrogen/oxygen mixtures, those comprising nitrogen and oxygen in a volume ratio in the range from 6:1 to 100:1, also referred to as low-oxygen air in the context of the present invention, preferably from 23:1 to 80:1, are suitable. Hydrogen is formed during the dissolution of cobalt and can accumulate and is inert in respect of the actual chemical reaction of the dissolution of cobalt.

Preference is given to working in an atmosphere of hydrogen or inert gas. The preferred inert gas is nitrogen.

In order to produce an atmosphere of low-oxygen air, it is possible, for example, to mix air and nitrogen with one another and feed this mixture into the reaction vessel. Thus, for example, it is possible to select a tube reactor which is configured as a column and has a sieve plate or a mesh as bottom through which low-oxygen air, inert gas or hydrogen is passed as reaction vessel.

In an embodiment of the present invention, step (a) is carried out continuously, with the aqueous cobalt sulfate solution formed being continuously taken off and aqueous sulfuric acid and optionally metallic cobalt being replenished when required. In another embodiment of the present invention, step (a) is carried out batchwise.

In an embodiment of the present invention, step (a) is carried out in a stirred vessel. In another embodiment of the present invention, step (a) is carried out in a tube reactor which is configured as a column and has a sieve plate or a mesh as bottom.

Possible materials for the reaction vessel are, for example, epoxy resins, unfilled or filled with glass fibers, also laminated epoxy-glass fiber materials, plastics such as polypropylene, PVC or PVDF (polyvinylidene chloride), and also plastic tubing introduced into steel outers. Further possible materials are lead and lead alloys. Particular preference is given to polypropylene or glass-fiber-reinforced epoxy. Metal vessels, for example steel vessels, can be lined with the abovementioned material.

The process of the invention can be carried out with step (a) being carried out once, for example for a time in the range from 30 seconds to 30 minutes. In another embodiment of the present invention, step (a) is carried out a plurality of times, for example from twice to ten times and in each case for a time, identical or different, in the range from 40 seconds to 5 minutes.

In an embodiment of the present invention, step (a) can be carried out until the content of $H_2SO_4$ has decreased to from 0.05 to 1% by weight, based on acidic cobalt sulfate solution which can be obtained in step (a), preferably from 0.1 to 0.5% by weight.

An acidic cobalt sulfate solution which can, for example, have a pH in the range from 0.7 to 2 is obtained.

In step (b), the acidic cobalt sulfate solution prepared in step (a) is purified by means of an ion exchanger. The acidic cobalt sulfate solution prepared in step (a) is preferably allowed to cool beforehand.

Ion exchangers used in step (b) can be selected from among inorganic and preferably organic ion exchangers. In an embodiment of the present invention, ion exchangers are selected from among weakly basic organic ion exchangers.

Ion exchangers used in step (b) can be selected from among ion exchangers in the form of particles. Particles of an ion exchanger can, for example, have an average diameter in the range from 400 to 800 μm.

In an embodiment of the present invention, ion exchangers are selected from among crosslinked, preferably divinylbenzene-crosslinked, polystyrenes which bear primary, secondary or preferably tertiary amino groups. Primary, secondary or preferably tertiary amino groups can be bound via a spacer to the aromatic groups of the polystyrene, for example via methylene or ethylene groups. Examples of tertiary amino groups are —$CH_2$—$N(CH_3)_2$ groups and —$CH_2$—$N(C_2H_5)_2$ groups.

In another embodiment of the present invention, ion exchangers are selected from among divinylbenzene-crosslinked polystyrenes comprising sulfonic acid groups.

The ion exchanger can be located in an ion-exchange apparatus. An ion-exchange apparatus comprises at least one column filled with ion-exchange resin, preferably two such columns. It is industrially advantageous to connect two or more ion-exchange columns to one another in such a way that it is possible to regenerate one or more ion-exchange columns without having to interrupt the preferred continuous operation of the ion-exchange apparatus. The ion exchanger can, for example, be regenerated using dilute sodium hydroxide solution. Before and after the treatment with sodium hydroxide, water or dilute sulfuric acid can optionally be used as flushing medium.

In an embodiment of the present invention, step (b) is carried out at a temperature in the range from 15 to 40° C., preferably in the range from 20 to 35° C.

In an embodiment of the present invention, the pressure drop in step (b) is in the range from 0.1 to 0.4 bar.

Calcium ions and magnesium ions, for example, can readily be removed from aqueous cobalt sulfate solutions by purification of the cobalt sulfate solution by means of an ion exchanger.

The process of the invention makes it possible to prepare aqueous cobalt sulfate solutions which have a pH in the range from 5 to 8 and comprise only extremely small proportions of ions which interfere in lithium ion batteries. Furthermore, the process of the invention can be operated simply and safely.

In a specific variant of the present invention, a further step (c) in which (c) the resulting aqueous cobalt sulfate solution is purified by means of a filter can be carried out after step (b).

Examples of suitable filter materials are filter cloths, for example made of wool, cotton, paper, synthetic or mineral fibers. Other suitable filter materials are, for example, porous filter compositions, for example ceramic. Candle filters are also suitable.

Step (c) can, for example, be assisted by pressure, for example by application of a reduced pressure on the side of the filtrate, for example by use of a suction filter, or by application of superatmospheric pressure on the side of the filter cake, for example by means of suitable pumps.

In an embodiment of the present invention, filters which have an average pore diameter in the range from 0.1 to 100 µm, preferably from 0.3 to 50 µm, are used.

In one variant, one or more filter aids, for example kieselguhr or Celite®, can be added.

Impurities of Cr(III), Al(III) and Fe(III), in particular, which are present as hydrated oxides or hydroxides in the form of precipitates in cobalt sulfate solutions obtained according to the invention can be removed by filtration.

Carrying out the process of the invention gives aqueous solutions of cobalt sulfate which can have a concentration in the range from 2 to 15% by weight, preferably from 6 to 9% by weight, of $Co^{2+}$. The concentration of cobalt sulfate in step (b) can alter as a function of the way in which step (b) is carried out, for example as a result of addition of an aqueous solution of $H_2O_2$ or evaporation of water. Particularly when oxygen or oxygen-comprising gas is used in step (b), the cobalt sulfate concentration does not change significantly in step (b).

Carrying out the process of the invention can give aqueous solutions of cobalt sulfate which comprise only small amounts of impurities which would interfere in batteries.

In an embodiment of the present invention, an aqueous cobalt sulfate solution having a content of iron ions of not more than 50 ppm, preferably from 1 to 10 ppm, based on cobalt, is obtained. Here, iron ions are present as Fe(II) or preferably as Fe(III) or as a mixture of Fe(III) and Fe(II).

In an embodiment of the present invention, an aqueous cobalt sulfate solution having a content of aluminum ions of not more than 50 ppm, preferably from 1 to 10 ppm, based on cobalt, is obtained.

In an embodiment of the present invention, an aqueous cobalt sulfate solution having a content of calcium ions of not more than 50 ppm, preferably from 1 to 10 ppm, based on cobalt, is obtained.

In an embodiment of the present invention, an aqueous cobalt sulfate solution having a content of copper(II) ions of not more than 50 ppm, preferably from 1 to 10 ppm, based on cobalt, is obtained.

In an embodiment of the present invention, an aqueous cobalt sulfate solution having a content of chromium(III) ions of not more than 50 ppm, preferably from 1 to 10 ppm, based on cobalt, is obtained.

In an embodiment of the present invention, an aqueous cobalt sulfate solution having a content of calcium ions, copper(II) ions and chromium(III) ions of in each case not more than 50 ppm, preferably from 1 to 10 ppm, based on cobalt, and a content of iron ions and aluminum ions of in each case not more than 50 ppm, preferably from 0.1 to 10 ppm, is obtained.

The proportion of copper(II) ions, iron ions, calcium ions, aluminum ions and chromium(III) ions can, for example, be determined by optical emission spectrometry with inductively coupled plasma, referred to as ICP-OES (inductively coupled plasma-optical emission spectrometry) for short.

In an embodiment of the present invention, an aqueous cobalt sulfate solution having a content of sodium ions of not more than 1000 ppm, for example from 100 to 1000 ppm, determined, for example, spectroscopically, based on cobalt, is obtained.

Nickel ions generally do not interfere when cobalt sulfate solution obtained according to the invention is to be used for producing electrode materials. In an embodiment of the present invention, an aqueous cobalt sulfate solution comprising not more than 2% by weight of nickel ions, based on cobalt, is obtained. Nickel can, for example, be determined by optical emission spectrometry with inductively coupled plasma, referred to as ICP-OES (inductively coupled plasma-optical emission spectrometry) for short.

The invention is illustrated by examples.

General Note: Standard I: Standard Liters

The pH was determined in each case at 23° C. using a glass electrode (combination electrode) which was calibrated by means of buffer solutions at pH values of from 4 to 7.

Reaction apparatus: double-wall tube reactor (internal diameter: 50 mm, height 500 mm, of which 300 mm are utilized, with sieve plates). The double-wall tube reactor was connected via a pump circuit to a reservoir, so that solutions can be taken off from the double-wall tube reactor at the bottom and conveyed into the reservoir and solutions can be pumped into the double-wall tube reactor at the top. A heat exchanger was located at the inlet of the double-wall tube reactor.

EXAMPLE 1

Step 1(a)

1.3 kg of cobalt metal (electrode fragments, dimensions: thickness from 1 to 2 mm, diameter 20 mm, circular cross section) were placed in the double-wall tube reactor of the reaction apparatus. The reservoir was charged with 443 g of 20% strength aqueous sulfuric acid.

After setting an internal temperature of 98.5° C. in the double-wall tube reactor, a stream of 20 standard l/h of nitrogen was introduced into the double-wall tube reactor via a sieve plate and the pump of the pump circuit was set into operation at a pumping rate of 1.1 l/h. The aqueous sulfuric acid/acidic cobalt sulfate solution from the reservoir was continually fed at a temperature of about 98° C. into the double-wall tube reactor.

After 20 hours, the acidic cobalt sulfate solution in the reservoir had a pH of 1.7 (residual amount of sulfuric acid: about 3 g/l), and the $Co^{2+}$ content was 8 g/100 g of solution.

Step 1(b)

A divinylbenzene-crosslinked polystyrene which bore $CH_2$—$N(CH_3)_2$ groups, commercially available as Amberlite® IRA96, was used as ion exchanger and was activated by means of 3% strength by weight sodium hydroxide solution. The above-described ion exchanger was placed in an ion-exchange column which had an internal diameter of 20 mm and a length of 500 mm. The ion-exchange column was filled to an extent of 80% by volume with ion exchanger.

Acidic cobalt sulfate solution from step 1(a) was conveyed from the reservoir to the ion-exchange column and eluate was taken off continuously at the lower end at a flow rate of 15 ml per minute.

A total of 2.8 liters of acidic cobalt sulfate solution were passed over the ion exchanger. The pH of the eluate then dropped to 2. 2.8 liters of cobalt sulfate solution having a $Co^{2+}$ content of about 8% by weight and a pH of from 6 to 7 were obtained.

The invention claimed is:

1. A process for preparing an aqueous cobalt sulfate solution having a pH of from 5 to 8, the process comprising:
   (a) dissolving metallic cobalt in aqueous sulfuric acid in an atmosphere of hydrogen or of inert gas or of nitrogen/oxygen mixtures comprising nitrogen and oxygen in a volume ratio of from 6:1 to 100:1, thereby obtaining an acid cobalt sulfate solution, and
   (b) purifying the acidic cobalt sulfate solution in an ion exchanger.

2. The process according to claim 1, wherein the ion exchanger is a crosslinked or a sulfonated polystyrene.

3. The process according to claim 1, wherein said dissolving (a) is carried out at a temperature of from 80 to 110° C.

4. The process according to claim 1, further comprising
   (c) purifying the aqueous cobalt sulfate solution via a filter.

5. The process according to claim 1, wherein a concentration of the aqueous sulfuric acid in said dissolving (a) is from 10 to 30% by weight.

6. The process according to claim 1, wherein the aqueous cobalt sulfate solution comprises an Na+ content of not more than 1000 ppm, based on cobalt.

7. The process according to claim 1, wherein the aqueous cobalt sulfate solution comprises iron ions at a content of not more than 50 ppm, based on cobalt.

8. The process according to claim 1, wherein the aqueous cobalt sulfate solution comprises calcium ions at a content of not more than 50 ppm, based on cobalt.

9. The process according to claim 1, wherein the aqueous cobalt sulfate solution comprises copper(II) ions at a content of not more than 50 ppm, based on cobalt.

10. The process according to claim 1, wherein the aqueous cobalt sulfate solution comprises aluminum ions at a content of not more than 50 ppm, based on cobalt.

11. The process according to claim 1, wherein the aqueous cobalt sulfate solution comprises chromium(III) ions at a content of not more than 50 ppm, based on cobalt.

* * * * *